May 18, 1926.
M. L. MANEY
ROAD MAINTENANCE MACHINE
Filed Dec. 31, 1924
1,585,307
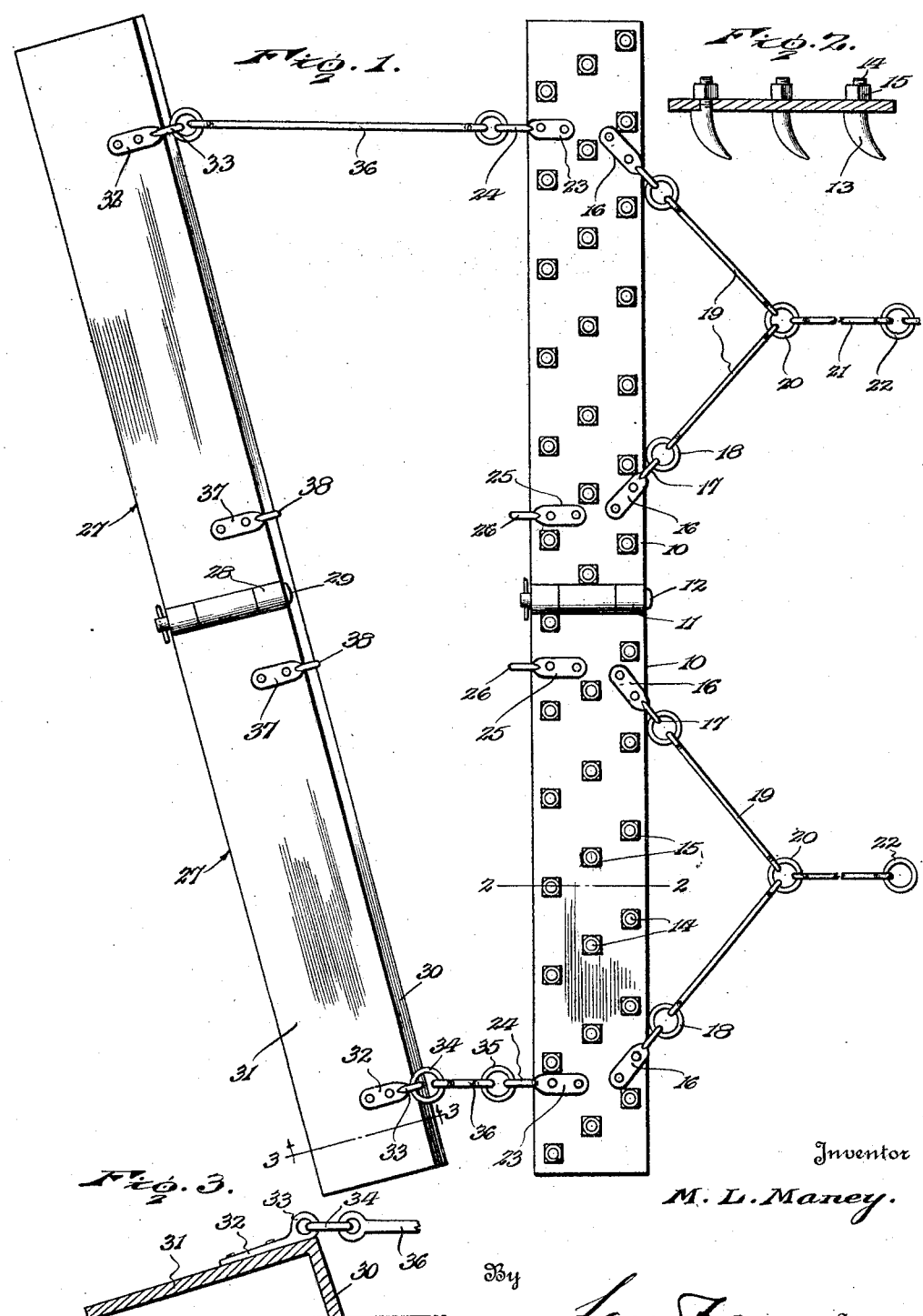

Patented May 18, 1926.

1,585,307

UNITED STATES PATENT OFFICE.

MELVIN L. MANEY, OF WEST ASHEVILLE, NORTH CAROLINA.

ROAD-MAINTENANCE MACHINE.

Application filed December 31, 1924. Serial No. 759,131.

This invention relates to an improved road-maintenance machine and seeks, among other objects, to provide a light machine of this character which may be hitched to a vehicle or pulled direct by a team or tractor over a road surface for repairing the road.

The invention seeks, as a further object, to provide a machine particularly adapted for use in repairing dirt, sand, clay or gravel roads and maintaining such roads before heavier machinery is needed to bring them back to condition.

And the invention seeks, as a still further object, to provide a machine embodying a cutter for scarifying and loosening the road surface and also embodying a drag for smoothing out the loose material.

Other and incidental objects will appear hereinafter.

In the drawings:

Figure 1 is a plan view of my improved road maintenance machine.

Figure 2 is a detail sectional view on the line 2—2 of Figure 1, and

Figure 3 is a detail sectional view on the line 3—3 of Figure 1, looking in the direction indicated by the arrows.

Referring now more particularly to the drawings, it will be seen that the cutter of the machine comprises a body bar which is formed of like sections 10 provided at their inner ends with hinge lugs 11 and extending through said lugs is a pivot pin 12 detachably and swingingly connecting the sections. As brought out in Figure 2, each of the sections may be in the nature of a metal plate and mounted upon the sections is a plurality of teeth 13 which are arranged in rows extending diagonally of the sections. The teeth 13 are curved forwardly at their lower end portions while at their upper ends said teeth are formed with studs 14 to extend through the sections, and screwed upon said studs are nuts 15 detachably securing the teeth in place. Riveted or otherwise secured to each of the sections 10 near the ends thereof is a pair of plates 16 projecting at the forward edges of the sections and provided with eyes 17 which carry rings 18. Freely connected to the rings of each pair of the plates 16 is a pair of rods 19 connected at their outer ends by a ring 20 and freely engaged with the rings 20 are rods 21 at the free ends of which are loosely mounted rings 22. Preferably, the ends of the several rods are bent to form loops freely receiving the rings therethrough.

Riveted or otherwise secured to the rear margins of the sections 10 of the body bar of the cutter near the outer ends of said sections, is a pair of plates 23 projecting at the rear edges of the sections and provided with eyes 24. The sections 10 are also preferably equipped near their inner ends with a similar pair of plates 25 having eyes 26. Flexibly connected with the pair of plates 23 is a drag which is preferably in the nature of an angle bar of sections 27. At their meeting ends the sections 27 of the bar are provided with hinge lugs 28 and extending through said lugs is a pin 29 pivotally and detachably connecting the sections. As brought out in Figure 3, the bar is formed with a relatively narrow flange 30 to bear at its lower edge against the road surface, and a relative wide rearwardly inclined flange 31 to rest at its rear edge against the road surface behind the flange 30. Riveted or otherwise secured to the sections 27 of the angle bar near the outer ends of said sections are plates 32 projecting at the forward edge of the flange 31 of said bar and provided with eyes 33 which carry rings 34. The eyes 24 of the pair of plates 23 of the cutter carry similar rings 35 and extending between the rings 34 and 35 are connecting rods 36, one of which is considerably longer than the other so that the drag will thus occupy an inclined position with respect to the cutter. As in the instance of the rods 19 and 21, the rods 36 are preferably bent at their ends to form loops freely receiving the rings 34 and 32 therethrough to thus provide a flexible connection between the cutter and the drag. The sections 27 of the angle bar of the cutter are further equipped near their inner ends with a pair of plates 37 similar to the pair of plates 25 and said pair of plates 37 is provided with eyes 38 so that, if desired, connections formed of parts like the parts 34, 35, and 36, may be arranged to extend between the eyes 26 of the plates 25 and the eyes 38 of the plates 37 for coupling the inner ends of the sections of the body bar of the cutter with the inner ends of the sections of the angle bar of the drag.

As will now be readily understood, the machine may, by means of the rings 22, be hitched to the rear of a tractor or other vehicle when the machine may be pulled over the surface of the road to be repaired. As the machine progresses, the road surface will be scarified or cut by the teeth 13 so that the surface material of the road will be loosened, when the drag, following in the rear of the cutter, will smooth out the loosened material and finish the road surface. By forming the cutter as well as the drag of pivotally connected sections, the cutter and drag will better conform to the contour of the road while also, as will be understood, the machine may be more or less compactly folded for transportation. In some instances, it may be found advisable to use a wooden beam as a drag in lieu of the angle bar. In such event, the beam will comprise pivotally connected sections, like the bar, and will be connected with the cutter in like manner.

Having thus described the invention, what I claim is:

A road machine comprising a surface scarifying member provided with a plurality of rows of scarifying elements having a staggered relation, and comprising hingedly connected sections, a drag in the rear of the scarifying member and arranged at an angle and comprising corresponding hingedly connected sections, and including a narrow forwardly inclined flange and a wide rearwardly inclined flange, and flexible connecting means between corresponding sections of the scarifying member and drag.

In testimony whereof I affix my signature.

MELVIN L. MANEY. [L. S.]